July 1, 1930.  C. SCHÄRER  1,769,549
CUFF BUTTON
Filed May 3, 1929
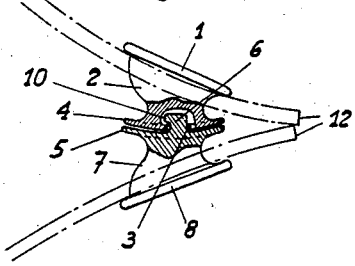
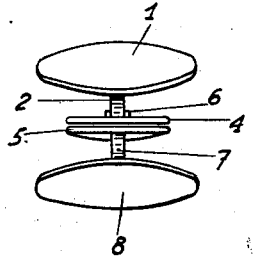
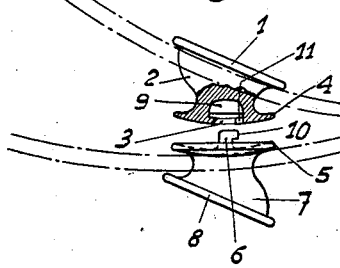
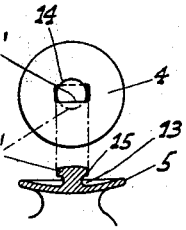
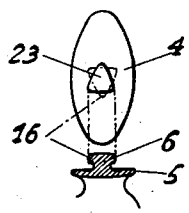
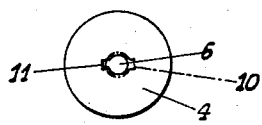
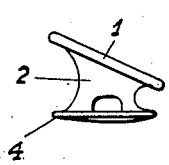 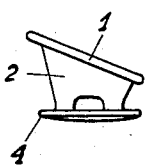 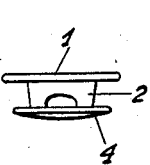 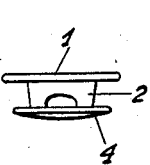
Inventor
Carl Schärer
By D. Singer, Atty.

Patented July 1, 1930

1,769,549

UNITED STATES PATENT OFFICE

CARL SCHÄRER, OF ZURICH, SWITZERLAND

CUFF BUTTON

Application filed May 3, 1929, Serial No. 360,175, and in Germany May 9, 1928.

The present invention relates to a new and improved cuff button comprising separable interengaging stud and socket members.

The main object of the invention is to provide a cuff button of the type aforesaid having such stud and socket members which may be brought into engagement by a relative rotative movement of the members and which may be separated in the same manner.

A further object of this invention consists in the provision of means which prevent a relative rotation of the stud and socket members and therefor an accidental disengagement of the said members.

A still further object of the invention consists in the construction of a cuff button of the type aforesaid having no springs or springy parts to lock the stud and socket members.

With these and other objects in view the invention consists in such parts and combination of parts as hereinafter described and claimed in the appended claim.

In the accompanying drawings which form part of the specification

Fig. 1 is a side elevation partially in central vertical section of the preferred form of construction of my cuff button the members being engaged.

Fig. 2 is a side view thereof,

Fig. 3 is a like showing of the same as Fig. 1 with the members released,

Fig. 4 is a face view of the socket member,

Figs. 5 and 6 illustrate each in a face view and in cross section modifications of the socket member and the stud members, Figs. 7 to 10 illustrate each in a side elevation different modes of construction of the socket member.

In the drawing 1 denotes the socket member and 8 the stud member of the cuff button. Each of the members 1, 8 comprises an outer head and an inner head 4, 5 respectively. Each member 1, 8 moreover is provided with a post 2, 7 respectively of oblong rectangular cross section. The face of the inner head 4 is convex that of the head 5 is concave, the curvature is the same and the faces touch each other (Figs. 1 and 2). In the socket member 1 a recess 9 is arranged adapted to receive a projection 6 of the stud member 8 standing at a right angle to the face of the inner head 5. The projection 6 is provided with nose 10, adapted to pass through a notch 11 in a flange 3 of the recess 9 and to pass behind said flange, by rotating the members 1, 8 relatively to each other.

In Fig. 1 the members 1, 8 are shown in engagement with each other the nose 10 positioned behind the flange 3 retains the members 1, 8. The members 1, 8 cannot turn accidentally, the flat posts 2, 7 having been passed through the button holes of the stiff cuffs 12 cannot turn therein but by the exertion of some force, applied by the person wearing the cuffs. To release the members 1, 8 one of the members for instance 8 is turned relatively to the other for about 180°. The members 1, 8 assume the position as shown in Fig. 3, the nose 10 is brought over the notch 11 and passes through it, the members 1, 8 being moved apart by the cuff. If disengaged the members 1, 8 retain their relative position with reference to each other and the projection 6 finds the recess 9 easily by pressing the members 1, 8 toward each other.

In Figs. 5 and 6 two modifications of the stud and socket members are shown. The stud 6' (Fig. 5) projecting from the face of the head 5' is provided with an annular groove 13 and part of the head is cut away. The socket member is provided with a recess 14 adapted to receive the said stud 6'. By rotating the members 1, 8 relatively to each other the projecting rim portion 15 of stud 6' passes behind the protruding flange portion 3' of the socket member.

As shown in Fig. 6 the stud 6" may be provided with a head 16 of approximately triangular cross section. The socket member 4 has a recess 23 corresponding in shape to said head 16. By inserting the stud 6" in said recess and by turning the members into the position denoted by broken lines, the corners of the stud 6" pass behind the projecting flange of the recess, locking thereby the members 1, 8.

Figs. 7 to 10 illustrate several shapes of the member 1, the posts 2 may be made of different shape and size and the inner and outer heads 1 and 4 may stand at an angle (Figs. 7 and 8) or they may be parallel to each other as shown in Figs. 9 and 10.

It will be apparent that the stud and socket members as heretofore described may be utilized for separable cuff buttons of the type herein shown, or that these members may be variously otherwise utilized in studs, solitaires and the like wherever a quick snapping and locking or a quick detaching and releasing action is desired, which latter is obtained by a relative rotative movement of the parts.

By the term "socket member" as used in the claim, I mean any member having an opening of a size and shape to receive the stud member.

The foregoing description is directed solely towards the construction illustrated, but I desire it to be understood that I reserve the privilege of resorting to all the mechanical changes to which the device is susceptible, the invention being defined and limited only by the terms of the appended claim.

What I wish to secure by U. S. Letters Patent, is:—

A cuff button comprising two members each having an outer head, an inner head and a flat shank connecting said heads, the said inner heads having curved opposing surfaces, the one concave and the other convex, one of said members having a locking stud at its inner end and the other having a socket at its inner end to receive said stud the said socket and stud being constructed and arranged to lock the members together when said members are in one position and to unlock said members when they are in another position.

In testimony whereof I affix my signature.

CARL SCHÄRER.